July 28, 1953 — H. E. WILLITTS — 2,646,685
SHAFT VIBRATOR

Filed Sept. 14, 1950 — 2 Sheets-Sheet 1

INVENTOR.
HENRY E. WILLITTS
BY
HIS ATTORNEY

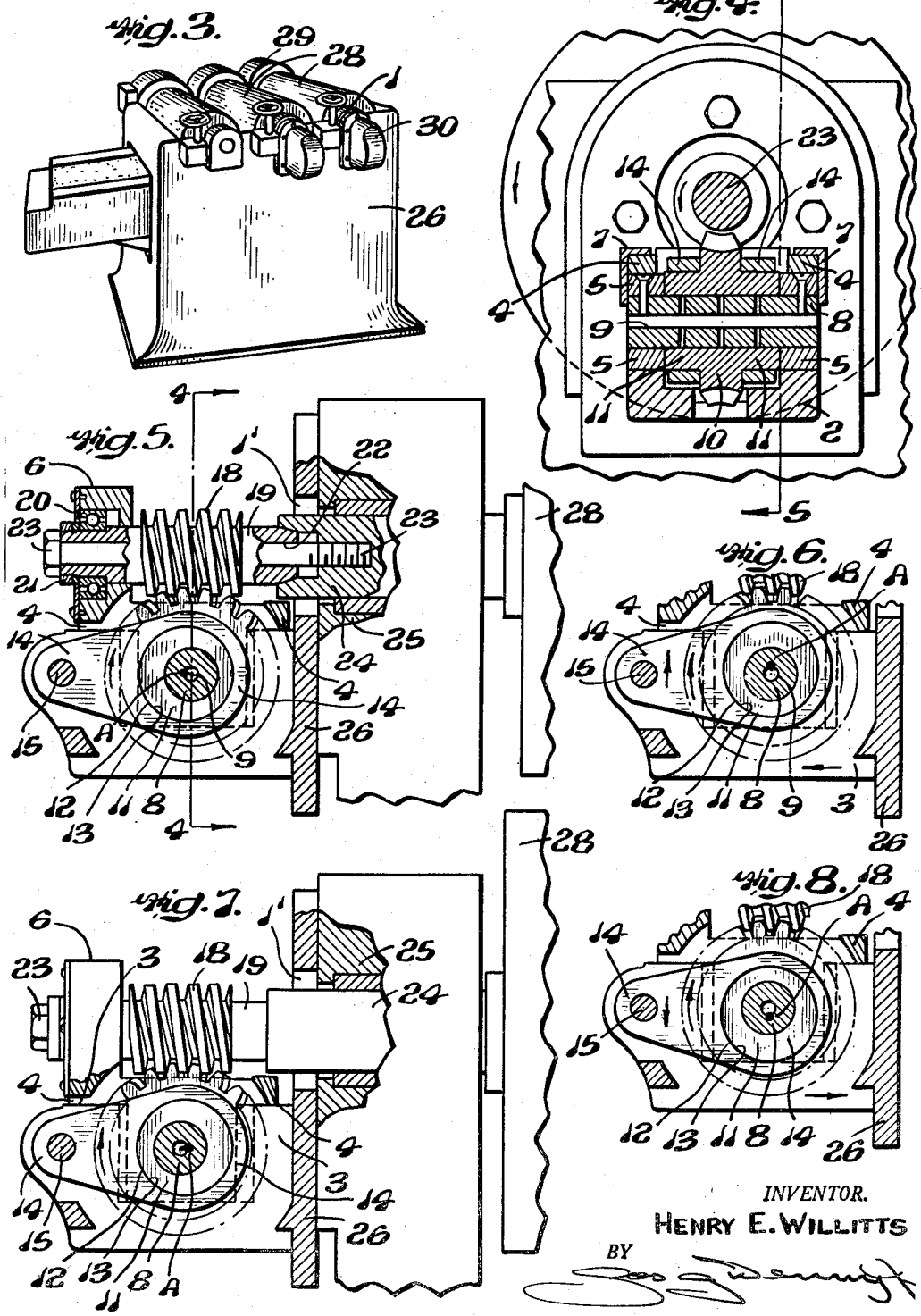

Patented July 28, 1953

2,646,685

UNITED STATES PATENT OFFICE 2,646,685

SHAFT VIBRATOR

Henry E. Willitts, Smithville, N. J., assignor to H. B. Smith Machine Co., Smithville, N. J., a corporation of New Jersey Application September 14, 1950, Serial No. 184,883

9 Claims. (Cl. 74—25)

My invention is a shaft vibrator designed to impart smooth, reciprocatory axial movements to a rotating shaft at a desired ratio to its rate of rotation and without chattering or twisting even under heavy loads.

In the preferred embodiment of my invention, my improved vibrator forms a self-contained unit readily attachable to and detachable from a rotary shaft and shaft support, and comprises a frame forming a slideway for a rectilinearly reciprocable carriage having a worm gear journalled therein with the axis of the worm coincident with the axis of the rotatable shaft and the axis of the worm wheel transverse to the axis of the worm. The worm wheel is provided with circular hubs on opposite sides thereof, the hubs having a common axis eccentric to the axis of the worm wheel. The circular hubs are journalled in concentric bearings in the ends of links lying on opposite sides of the worm wheel and having their ends remote from the hubs pivotally mounted on the frame on a horizontal axis parallel with the axis of rotation of the worm wheel. When the rotation of the worm gearing causes the protuberant portions of the hub surfaces to move into their upper and lower positions, the links are correspondingly moved toward and from the worm, but when the protuberant surfaces of the hubs are moved toward their forward and rearward positions, the carriage itself, with the worm gearing thereon, is moved rearwardly and forwardly respectively since the radial distance between the axis of the pivotal supports of the links and the axis of the link bearings for the hubs is unchanging, consequently, the rotation of the worm continuously and in the same direction results in backward and forward thrusts on the carriage and therethrough on the worm and on the mechanism connected with the worm, and through which the worm may be rotated. The positioning of the hubs and links on opposite sides of the worm wheel results in a balancing of forces avoiding any tendency to skew the worm wheel and prevents twisting or chattering of parts.

My improved vibrator is suitable for use wherever it is desired to impart a reciprocatory motion to a rotating shaft, but it is particularly adapted for the reciprocation of the rotating abrasive drums or rollers of sanding machines.

The principles of my invention and the best mode in which I have contemplated applying such principles will further appear from the following description and the accompanying drawings in illustration thereof.

Figure 1:
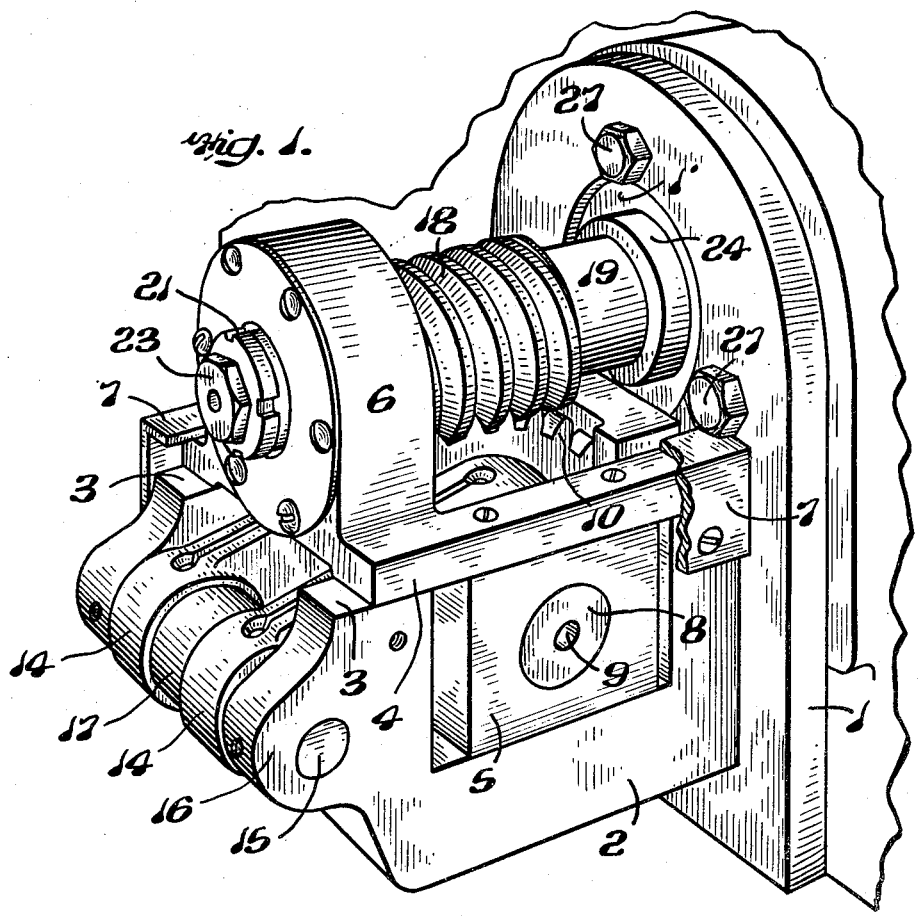
Figure 2:
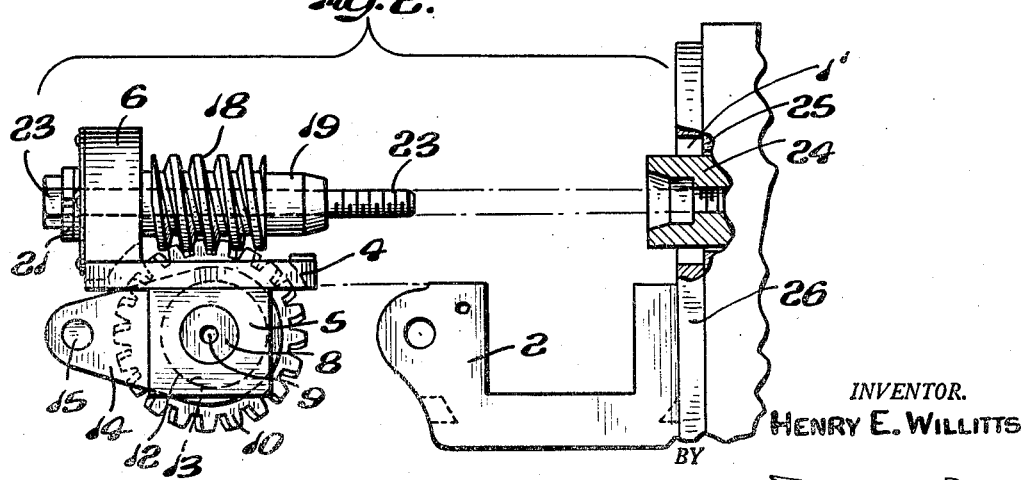

Fig. 1 is a perspective view of a shaft vibrator embodying my invention, with part of one carriage retainer broken away; Fig. 2 is an exploded view, of the vibrator shown in Fig. 1 and a shaft and shaft support to which it is to be connected, the parts being shown partly in side elevation and partly in section; Fig. 3 is a perspective view showing the application of my improved vibrator to the ends of abrasive drums of a conventional sander; Fig. 4 is a transverse sectional view taken on the line 4—4 of Fig. 5; Fig. 5 is a longitudinal sectional view taken on the line 5—5 of Fig. 4 with the hub protuberances in their rearmost positions and the carriage advanced to its foremost position; Fig. 6 is a fragmentary longitudinal sectional view of part of the mechanism shown in Fig. 5 with the hub protuberances advanced to their uppermost position and the carriage in an intermediate position; Fig. 7 is a longitudinal sectional view similar to Fig. 5 but showing the hub protuberances in their foremost position and the carriage retracted to its rearmost position; and Fig. 8 is a fragmentary longitudinal sectional view generally similar to Fig. 7 but with the hub protuberances in their lowermost position and the carriage in an intermediate position.

The embodiment of my invention illustrated in the drawings comprises a support or frame having a vertical face plate 1 with substantially U-shaped arms 2 projecting horizontally therefrom and having horizontal surfaces 3 forming a slideway for a carriage 4. The carriage has cheeks 5 depending downward between the bifurcation of the arms 2 and an upright pillar 6 transverse to the cheeks 5.

The carriage is held in sliding relation to the upper surfaces of the arms 2 by flanged rails 7 fixed to the arms 2 and having lips overlying the upper surfaces of the sides of the carriage 4.

A shaft 8 is seated, and preferably fixed, in the cheeks 5 and contains lubricant passages 9. A toothed worm wheel 10 is journalled on the shaft 8 and provided with hubs or circular bosses 11 whose side faces abut against and are positioned by the cheeks 5. The axes, or centers of revolution of the surfaces, of the hubs 11 are coincident with one another but are eccentric to the axis of the shaft 8 and the coincident axis of rotation of the teeth of the worm wheel 10, thereby forming on the hub protuberant surfaces 12 with respect to the axis of rotation of the worm wheel teeth.

The circular but eccentric hubs 11 are journalled in circular bearings 13 in the ends of links or arms 14 which are pivotally connected with the arms 2, as, for instance, by being sleeved on a shaft 15 fixed in the apertured bosses 16 on the arms 2; the links being spaced from one another by the spacer 17.

The teeth of the worm wheel 10 mesh with a worm 18 on a shaft 19, journalled in the upright pillar 6, preferably, by having a reduced section thereof seated in the inter race ring of the antifriction bearing 20 and held against axial movement by the nuts 21.

The shaft 19 contains a bore 22 for the passage of a headed bolt 23 by which the tapered nose of the shaft 19 may be coupled to the socketed end of a shaft 24 projecting through the aperture 1' of the face plate 1 and journalled in an elongated bearing 25 of a housing 26 to which the face plate 1 may be detachably secured by bolts 27.

As an example of the utilization of my shaft vibrator, I have shown its face plate 1 attached to the housing 26 of a sanding machine and its worm shaft 19 bolted to the shaft 24 of an abrasive drum or roller 28 whose opposite end is splined with respect to and rotated by an electric motor 29.

The operating parts of the vibrator may be covered by a suitable housing 30 detachably fixed to the face plate.

The rotation of the drum 28 by the motor 29 causes the rotation of the shafts 24 and 19 and worm 18 and the rotation of the worm wheel 10 at a reduced rate of speed and on an axis transverse to the concentric axes of the parts 18, 19, 24 and 28.

Assuming that the parts are in the position illustrated in Fig. 5, the carriage 4 is in its innermost position and consequently the worm 18 and shafts 19, 24 and drum 28 will be shifted inward toward the motor 29. In this position, the axis of the hubs 11, indicated by the point A, will be horizontally aligned with the axes of the shafts 8 and 15 and the protuberances 12 of the hubs will project rearwardly toward the shaft 15. The rotation of the worm wheel 10 clockwise gradually moves the parts to the position shown in Fig. 6 in which the point A of the hubs and the protuberances 12 of the hubs 11 are vertically above the axis of the shaft 8 and worm wheel 10 and the links 14 have been oscillated upward around their shaft 15 and the carriage 4 and its associated parts have been moved toward the left to an intermediate position.

Further clockwise movement of the worm wheel 10 to the position shown in Fig. 7 brings the point A and the protuberances 12 of the hubs 11 into horizontal alignment with the axes of the shafts 8 and 15 and the carriage 4 and its associated parts has been moved to its extreme retracted or leftward position where the shaft 24 and drum 28 is farthest away from the motor 29.

Further clockwise rotation of the worm wheel 10 to the position shown in Fig. 8 brings the point A and the projection 12 vertically beneath the axis of the shaft 8 and of the worm wheel with consequent movement of the links 14 downward around their shaft 15 and the advance of the carriage 4 and its connected parts forward to the intermediate position.

It will thus be seen that the rotating abrasive roller 28 is gradually and smoothly reciprocated axially so that no part of the abrasive surface remains in contact with the same longitudinal strip of the work passing through the machine beneath the abrasive roller.

It will be observed that the tops of the arms 2 and the flanged rails 7 form grooves or slots for receiving the sides of the carirage 4 so that there is a tongue and groove connection between the carriage and its support which prevents any appreciable tilting of the carriage relative to its support. Hence, any upward or downward stresses imparted to the shaft 8 by the rotation of the hubs in the link bearings is transmitted directly to and absorbed by the frame or support without applying any tilting stress to the shaft 19 or its coupling with the shaft 24. The journalling of the link bearings on the hubs of the worm-wheel between the supporting cheeks 5 permits the provision of extended bearing surfaces and minimize wear and chatter or inadvertent loosening and disassembly of the parts. The journalling of the worm wheel 10 and its hubs 11 on a fixed shaft simplified assembly, minimizes distortion of the shaft and facilitates lubrication.

Having described my invention, I claim:

1. Apparatus of the character described comprising a support having pairs of end members forming slideways, a carriage reciprocable on said slideways, retainers substantially preventing tilting of said carriage relatively to said support, said carriage having cheeks between the members of said pairs and a pillar transverse to said cheeks, a shaft seated in said cheeks, a rotatable worm wheel sleeved on said shaft and having hubs with circular faces eccentric to the axis of rotation of said wheel, links journalled to said frame and on said hubs, and a shaft journalled in said pillar and having a worm meshing with said worm wheel to impart rotation thereto and effect reciprocation of said carriage by the rotation of said eccentric hubs in said links.

2. Apparatus of the character described comprising a support, a carriage reciprocable on said support and having complementary cheeks, a rotatable toothed wheel supported by said cheeks, links disposed between said wheel and cheeks and having journalled connections with said support and with said wheel eccentrically to the axis of rotation of said wheel, and a shaft journalled in said carriage and operatively connected with said toothed wheel to effect rotation thereof and the reciprocation of said carriage.

3. Apparatus of the character described comprising a support having substantially U-shaped arms, a carriage reciprocable on said support and having cheeks disposed between the furcations of said arms and a pillar projecting from said carriage, worm gearing having members mounted in said cheeks and pillar respectively, and a link having journalled connections with said support and gearing.

4. Apparatus of the character described comprising a support, a carriage reciprocable on said support, means including worm gearing carried by said carriage for effecting the reciprocation thereof, said gearing including a shaft extending parallel with the direction of reciprocation of said carriage, said shaft having a tapered inner end and containing a through bore, and a bolt extending through said bore and having a threaded end adjacent to the tapered end of said shaft and an enlarged head opposite said threaded end.

5. A vibrator comprising a carriage, a worm shaft journalled in said carriage, a frame supporting the weight of said carriage independently of said shaft, a worm wheel journalled in said carriage and meshing with said worm shaft, said worm wheel having circular hubs with faces eccentric to the axis of rotation of said worm wheel, and rigid links each having an end pivotally connected to said frame and an end journalled on one of said hubs in close juxtaposition to said worm wheel.

6. A shaft vibrator comprising a carriage having spaced cheeks and a pillar having a bearing between the planes of said cheeks, a worm shaft journalled in said pillar, a frame supporting the weight of said carriage independently of said worm shaft, a worm wheel supported by said cheeks in meshing relation to said worm shaft, said worm wheel having hubs thereon between said wheel and cheeks, said hubs having surfaces eccentric to the center of rotation of said worm wheel, and rigid links each having an end pivotally connected with said frame and an end journalled on one of said hubs between said worm wheel and one of said cheeks.

7. A shaft vibrator comprising a frame having a face plate and arms projecting therefrom, links pivotally connected with said arms adjacent to the end thereof remote from said face plate, a worm gear having hubs journalled in the other ends of said links and lying between said face plate and the pivotally connected ends of said links, said hubs having surfaces eccentric to the axis of rotation of said worm wheel, and a worm shaft meshing with said worm wheel, said worm shaft rotating said worm wheel and being reciprocable by the rotation of said eccentric hubs in said links.

8. The combination with a machine having a vibratory shaft containing a tapered socket in an end thereof, of a shaft vibrator comprising a hollow worm shaft having a tapered nose in said socket, a bolt extending through said worm shaft and rotatable therein from the end of said worm shaft opposite its nose to secure said nose in said socket, a worm wheel meshing with said worm shaft, links eccentrically connected with said worm shaft, and pivotal mountings carried by said machine for anchoring said links independently of said vibrator.

9. A shaft vibrator comprising a carriage having a pillar and complementary cheeks, a worm shaft journalled in said pillar, a frame supporting the weight of said carriage independently of said worm shaft, a worm wheel supported by said cheeks in meshing relation with said worm wheel, said wheel having hubs thereon between said cheeks, said hubs having surfaces eccentric of the axis of rotation of said worm wheel, links having ends pivotally connected with parts of said frame adjacent to said pillar and ends journalled on said hubs between said cheeks, and a bolt extending through and rotatable in said worm shaft and having a head at the end thereof adjacent to said pillar and a threaded end projecting from the opposite end of said worm shaft for the attachment thereof to the device to be vibrated.

HENRY E. WILLITTS.

References Cited in the file of this patent

UNITED STATES PATENTS

| Number | Name | Date |
|---|---|---|
| 209,648 | Bridgman | Nov. 5, 1878 |
| 563,593 | Hoenscheid | July 7, 1896 |
| 872,641 | Bouche | Dec. 3, 1907 |
| 1,584,717 | Belden et al. | May 18, 1926 |
| 1,685,757 | Storck | Sept. 25, 1928 |
| 2,300,549 | Huck | Nov. 3, 1942 |